United States Patent [19]

Borman

[11] 4,164,587
[45] Aug. 14, 1979

[54] WATER-BORNE BONDABLE BASE COAT AND SIZE COAT FOR THREE PIECE, TIN-FREE STEEL BEVERAGE CONTAINERS

[75] Inventor: Robert F. Borman, Delaware, Ohio

[73] Assignee: PPG Industries, Inc., Pittsburgh, Pa.

[21] Appl. No.: 885,849

[22] Filed: Mar. 13, 1978

Related U.S. Application Data

[62] Division of Ser. No. 608,370, Aug. 27, 1975, Pat. No. 4,098,745.

[51] Int. Cl.$^2$ .................... A21D 10/02; B65D 85/00; B32B 15/08
[52] U.S. Cl. ................................. 426/131; 220/458; 428/35; 428/458; 428/460; 428/461
[58] Field of Search ...................... 426/131, 126, 398; 220/458; 260/29.4 UA, 844, 848, 851, 855, 856; 428/35, 458, 460, 461

[56] References Cited

U.S. PATENT DOCUMENTS

| | | | |
|---|---|---|---|
| 3,991,216 | 11/1976 | Christenson et al. | 426/398 |
| 4,065,415 | 12/1977 | Christenson et al. | 260/29.6 TA |
| 4,075,141 | 2/1978 | Porter, Jr. et al. | 260/29.4 UA |
| 4,079,027 | 3/1978 | Phillips et al. | 260/29.4 UA |
| 4,105,615 | 8/1978 | Balatan | 426/131 |

*Primary Examiner*—William R. Dixon, Jr.
*Attorney, Agent, or Firm*—Charles R. Wilson

[57] ABSTRACT

Water-borne or aqueous coating compositions which are especially suitable for use as bondable base coats and size coats in three piece, tin-free steel beverage containers comprise blends of an aqueous dispersion of an amine solubilized interpolymer with aldehyde condensation resins. The interpolymer is prepared in the absence of mercaptans, external surfactants and external dispersion stabilizers and is formed from substituted carboxylic acid amide units; ethylenically unsaturated acid units; hardening units from monomers such as styrene, vinyl toluene or alkyl methacrylate having from 1 to 4 carbon atoms and flexibilizing units from certain alkyl acrylates or methacrylates. The interpolymers are solubilized by neutralizing or partially neutralizing the acid units of the interpolymer with monomeric amines. Aldehyde condensation resins, such as phenol aldehyde resins, aminoplast resins or mixtures thereof are especially desirable. These compositions provide three piece beverage containers with cured base coats and size coats which exhibit excellent adhesion to both the tin-free steel metal and the adhesive employed in forming the container. In addition, the cured base coats and size coats formed from these compositions do not impart undesirable turbidity or taste characteristics to beverages packaged therein.

9 Claims, No Drawings

WATER-BORNE BONDABLE BASE COAT AND SIZE COAT FOR THREE PIECE, TIN-FREE STEEL BEVERAGE CONTAINERS

This is a division of application Ser. No. 608,370, filed Aug. 27, 1975, now U.S. Pat. No. 4,098,745, issued July 4, 1978.

BACKGROUND OF THE INVENTION

During the past several years, the use of three piece cans made from tin-free steel and featuring a side seam bonded with an adhesive has increased dramatically in the container industry, particularly in containers for beverages (i.e., beer, carbonated and non-carbonated soft drinks, fruit juices and the like). Thus, literally billions of these containers have been used by brewers and other beverage packagers. One of the reasons why such containers have proven so popular is that their adhesive bonded side seam construction has essentially eliminated the necessity for the old side seam soldering process. This feature provides the mechanism for high speed bonding of the side seam and, consequently, permits much greater speed and efficiency in container line production.

However, while such containers have proven to be highly advantageous, their construction and method of preparation impose greater requirements on coating materials and particularly the base coats and size coats utilized in such containers. Thus, these three piece containers are generally prepared by a process which involves the steps of first passing a sheet of metal container body stock (i.e., tin-free steel) usually through a roll coater to apply the base coat composition; curing the base coat composition by passing the coated sheet through an oven and baking at elevated temperatures (i.e., 400° F. or above); turning the basecoated sheet over to apply the size coat; applying the size coat, usually by flowcoating; curing the size coat by passing the sheet through an oven and baking at elevated temperatures; applying decorative printing; passing the sheet stock to a splitter which cuts the sheet into can body blanks the size of the desired can cylinder; heating the body blank; applying a thermoplastic adhesive (e.g., thermoplastic polyamide) to one edge of the body blank; passing the body blank edge coated with adhesive to the body maker; reheating to elevated temperature (e.g., 475° F.) the body blank having previously applied adhesive; wrapping the heated body blank around a mandrel and then bumping the seam together with chilled tools operating at about −25° F. to bond the lap seam. Following this process, a protective coating is applied to the exposed cut edges of the can cylinder, the can cylinder is flanged, the interior of the can is sprayed with a topcoat and after curing the topcoat, one of the can ends is applied and seamed. At the conclusion of this process, the container is then ready to be packaged with beverage.

As is evident from the above brief description of the process, the base coats and size coats employed in the container are subject to strenuous processing conditions, including mechanical stress, varying temperatures and the like. In order to perform successfully in such an environment, base coat and size coat compositions must meet a number of difficult requirements. For example, such coatings must have excellent adhesion to metal (i.e., tin-free steel); excellent fabricating properties, i.e., a combination of flexibility, extensibility and adhesion so as to permit forming operations to be carried out on the coated metal without cracking or otherwise impairing the continuity of the film; excellent intercoat adhesion (e.g., adhesion to topcoat material); excellent adhesion to the bonding adhesive employed on the lap seam; and resistance to the high temperatures employed in container production or during pastuerization of the beverage (e.g., beer). In addition to the foregoing properties, while the size coat (exterior) and base coat (interior) may not be in direct contact with the packaged beverage, the possibility exists that due to incomplete topcoat coverage or accidental exposure in the seam area these coatings should also be formulated so that they do not adversely affect the taste characteristics of or cause turbidity in the packaged beverage.

As will be recognized from the above, the production of base coat and size coat materials meeting all of these requirements is a difficult undertaking. Furthermore, the problem of producing successful coating materials of that type has been even further complicated by the increasing national emphasis on ecological and environmental concerns. Due to these concerns, the coating and container industries today are vitally interested in replacing volatile organic solvent-based coating materials with aqueous coatings which eliminate or substantially minimize air pollution caused by solvent emissions during cure of the coating. To produce aqueous base coat and size coat materials for use in the three piece containers described above has proven to be a difficult task.

In accordance with this invention, a coating composition meeting all of the requirements for base coats and size coats in three piece tin-free steel beverage containers having adhesive bonded side seams has now been found. Thus, the base coat and size coat compositions of this invention have excellent adhesion to metal, excellent intercoat adhesion, excellent adhesion to seam bonding adhesive; good high temperature resistance; and do not adversely affect packaged beverages.

DETAILED DESCRIPTION OF THE INVENTION

This invention relates to water-borne or aqueous coating compositions suitable for use as base coats or size coats in three piece, tin-free steel beverage containers, the side seam of which is bonded with an adhesive. As indicated, the compositions herein have essentially the same formulation when employed for base coat or size coat usage. However, in some instances, it may be desirable in order to assist in identifying the base coat and size coat during container production to include very minor proportions of color dyes in the basecoat. Such an expedient is well known and does not form part of this invention. It should further be noted that as employed throughout the specification the term "beverage" refers to beer, carbonated and non-carbonate soft drinks, and fruit juices.

The novel compositions of this invention are composed of a blend of an aqueous dispersion of an amine-solubilized, substituted amide-containing interpolymer and an aldehyde condensation resin.

In formulating a coating composition for use as an internal coating material for metal containers in which beverages are to be stored, it is extremely important that the cured films produced from such coating compositions do not contain certain materials, even in residual amounts, which can be extracted by the beverage from the cured film. Thus, it has been found that certain additives commonly employed in the preparation of prior coating compositions may remain in residual amounts in cured films produced from such compositions and that even residual amounts of such additives can adversely affect the characteristics of beverages which may come in contact with such films. For example, residual amounts of such materials as mercaptan chain transfer agents commonly employed in polymerizing interpolymers such as those used and described herein; external surfactants and external dispersion stabilizers in cured films employed in metal beverage containers for beer have been found to exert adverse effects on the turbidity and/or taste characteristics of the beer. Accordingly, in preparing the compositions of this invention, such materials are avoided.

As indicated, one essential component of the compositions of this invention is an aqueous dispersion of an amine solubilized substituted amide-containing interpolymer. The interpolymer contains substituted carboxylic acid amide units; ethylenically unsaturated acid units; hardening units from monomers such as styrene, vinyl toluene or alkyl methacrylates having from 1 to 4 carbon atoms and flexibilizing units from certain alkyl acrylates or methacrylates.

As indicated, the interpolymer contains substituted amide units. These substituted amide units may be represented by the structure:

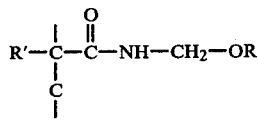

where R' is methyl or hydrogen and R is hydrogen or lower alkyl with at least 50 percent of the groups represented by R being lower alkyl.

These substituted amide units are units derived from acrylamide or methacrylamide. These units may be formed directly from substituted amides, such as N-(alkoxyalkyl)acrylamide or methacrylamide. N-(alkoxyalkyl)acrylamides or methacrylamides in which the alkoxy group is butoxy (i.e, where R in the formula above is butyl) are especially preferred since interpolymers prepared from such substituted amides exhibit the best balance of stability and efficient curing. In addition, mixtures of N-(alkoxyalkyl)acrylamide and N-methylolamide can also be used. These substituted amides can be prepared by several methods. One preferred method is to react an unsaturated amide (e.g., acrylamide) with formaldehyde and an alkanol (e.g., butanol) under acidic conditions and in the presence of a polymerization inhibitor. For a detailed description of this method, see U.S. Pat. No. 3,079,434, incorporated herein by reference. The resultant N-(alkoxyalkyl)acrylamide [e.g., N-(butoxymethyl)acrylamide] is then interpolymerized with the other monomers (described below) to form the interpolymer containing the substituted amide units.

As indicated, in the above method the substituted amide units of the interpolymer herein are formed by first separately preparing the substituted amide and then interpolymerizing it with the other monomers. Alternatively, these substituted amide units can be formed in situ, that is, the substituted amide units can be formed subsequent to the formation of the interpolymer. Thus, the unsaturated amide (e.g., acrylamide or methacrylamide) can first be interpolymerized with the other monomers and the resultant product then reacted with the aldehyde (e.g., formaldehyde) and alkanol (e.g., butanol). For a more detailed discussion of this reaction, see U.S. Pat. No. 3,037,963, incorporated herein by reference. This method has the disadvantage of requiring removal of any excess formaldehyde which has a troublesome odor, and in this method the degree of etherification of the methylol groups is more difficult to control; thus, in the above structure, the proportion of R groups which are alkyl rather than hydrogen may not be as desired. For good stability at least 50 percent of these groups should be alkyl, and usually it is preferred that all or nearly all be alkyl.

The interpolymer may contain, in polymerized form, from about 5 to about 50 percent of these substituted amides with the preferred range being from about 15 to about 30 percent.

The units of the interpolymer derived from ethylenically unsaturated carboxylic acid are best formed from acrylic acid or methacrylic acid, but itaconic acid, crotonic acid, and maleic acid, and half esters of maleic and fumaric acids may also be used. In the half esters, one of the carboxyl groups is esterified with an alcohol, the identity of which is not significant so long as it does not prevent polymerization or preclude the desired utilization of the product. Butyl hydrogen maleate and ethyl hydrogen fumarate are examples.

The interpolymer of the compositions of this invention may contain, in polymerized form, from about 3 to about 30 percent of such acid units. However, for the best balance of curing and ease of solubilization, it is preferred that the interpolymer contain from 5 to 15 percent of the acid units. It shall be noted that interpolymers of the compositions in some instances contain more acid than is required for solubilization purposes. This is desirable in order to obtain efficient curing of the interpolymer.

The other units in the interpolymer are derived from a combination of hardening and flexibilizing monomers, to provide the desired combination of properties. The hardening monomer is generally styrene, but others such as vinyl toluene or alkyl methacrylates having from 1 to 4 carbon atoms can also be used.

The interpolymer of the compositions of this invention may contain in polymerized form from about 5 to about 75 percent of units derived from hardening monomers with a preferred range being from about 40 to about 60 percent of such units.

The flexibilizing monomer component is one or more alkyl or substituted alkyl esters of acrylic acid or methacrylic acid, the alkyl groups having 1 to 13 carbon atoms in the case of acrylic esters and 5 to 16 carbon atoms in the case of methacrylic esters. Ethyl acrylate, butyl acrylate, and 2-ethylhexyl acrylate, 2-ethylhexyl methacrylate, decyl methacrylate and lauryl methacrylate are examples. Ethyl acrylate is especially preferred. The interpolymer of the compositions of this invention may contain in polymerized form from about 5 to about 75 percent of units derived from flexibilizing monomers with a preferred range being from about 20 to about 50 percent of such units.

The interpolymer is formed by polymerization in the presence of a vinyl polymerization catalyst. The preferred catalysts are azo compounds, such as, for example, alpha, alpha'-azobis(isobutyronitrile). Other useful catalysts are tertiary-butyl perbenzoate, tertiary-butyl pivalate, isopropyl percarbonate and similar compounds. In some instances, other free radical catalysts such as benzoyl peroxide and cumene hydroperoxide may also be useful.

As indicated, the compositions of this invention include an aqueous dispersion of the above-described interpolymers, wherein the interpolymer is solubilized with an amine. The aqueous medium of the dispersion may consist entirely of water in some cases but, more commonly, will consist of a mixture containing a major proportion of water and a minor proportion of water-soluble or water-miscible organic solvents. Suitable organic solvents are the ether type alcohols, such as ethylene glycol monobutyl ether (butyl Cellosolve), ethylene glycol monoethyl ether (ethyl Cellosolve) and the like, and lower alkanols having 2 to 4 carbon atoms such as ethanol, propanol, isopropanol, butanol, and the like. Minor proportions of hydrocarbon solvents such as xylene, toluene, and the like may also be present in the aqueous medium. Mixtures ot the ether type alcohols and lower alkanols can also be used. The preferred water-soluble, or water-miscible organic solvents are mixtures of butyl Cellosolve and isopropyl alcohol. The aqueous medium may contain from about 60 percent to about 100 percent, preferably 80 percent, by weight of water and from about 0 percent to about 40 percent, preferably 20 percent, by weight of water-soluble or water-miscible organic solvent. In addition, as referred to hereinbefore, minor proportions of hydrocarbon solvents may be included. In any event, the aqueous medium will contain at least 60 percent by weight of water.

As indicated, the aqueous dispersion is an aqueous dispersion of an amine-solubilized interpolymer. Thus, the interpolymer herein is rendered water-reducible or dispersible by the addition of a monomeric amine solubilizing agent. As is known in the art, acid group-containing interpolymers such as those employed in the present compositions can be rendered water-soluble or water-reducible by neutralizing or partially neutralizing the acid groups therein with amines. In general, the monomeric amines employed herein for that purpose may be any of the amines used for solubilizing resin systems known heretofore, including ammonia, ethyl amine, butylamine, dimethylamine, cyclohexylamine, morpholine, monoethanolamine, diethanolamine, diethylethanolamine, and the like. The preferred amines herein are monoethanolamine and dimethylethanolamine with dimethylethanolamine being particularly preferred since it has been found to provide excellent results.

The amount of monomeric amine employed in neutralizing or partially neutralizing the acid groups of the interpolymer to render it water-reducible or water-dispersible may vary considerably. However, it is preferred in the practice of this invention that the amount of amine employed be sufficient to neutralize about 50 percent of the theoretical quantity of acid groups present in the interpolymer.

Methods of preparing aqueous dispersions of the above-described interpolymers are known in the art. One method is to first form the interpolymer in solution by polymerizing the monomers in a water-miscible organic solvent or mixture of such solvents, following which the acid groups of the resultant interpolymer are neutralized with the monomeric amine, if desired, in the presence of water, to form the salt or partial salt of the interpolymer, thus enabling the interpolymer to be dissolved or dispersed in the aqueous medium. In this method, any excess organic solvent utilized in the polymerization process can be removed from the aqueous medium by distillation, if desired.

As referred to above, the aqueous coating compositions of this invention comprise blends of the above-described aqueous dispersions of amine-solubilized interpolymer and an aldehyde condensation resin.

Aldehyde condensation resins which may be employed in the compositions of this invention are preferably water-miscible or water-dispersible.

Aldehyde condensation resins which may suitably be employed include the condensation products of an aldehyde, particularly formaldehyde, with an amino- or amido-group carrying substance, such as, for example, urea, melamine, benzoguanamine and the like (i.e., aminoplast resins) and the condensation products of an aldehyde with a phenolic resin. Mixtures of these phenolic resins and aminoplast resins are advantageous. Of these resins, the especially preferred resins are the condensation products of an aldehyde with a phenolic resin.

The aminoplast resins used may be alkylated methylol melamine resins, alkylated methylol urea, and similar compounds. Products obtained from the reaction of alcohols and formaldehyde with melamine, urea or benzoguanamine (etherified products) are most common and are particularly preferred herein in that they have good water dispersibility. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diaminopyrimidine, 2,4,6-triethyl triamino-1,3,5-triazine, and the like.

While the aldehyde employed is most often formaldehyde, other similar condensation products can be made from other aldehydes or mixtures thereof, such as acetaldehyde, crotonaldehyde, acrolein, benzaldehyde, furfural, glyoxal and the like.

The particularly preferred aminoplast resins are those which contain methylol or similar alkylol groups, and in which at least a portion of the alkylol groups are etherified by a reaction with an alcohol. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as Cellosolves and Carbitols, and halogen-substituted or other substituted alcohols, such as 3-chloropropanol and butoxyethanol. The particularly preferred aminoplast resins are substantially etherified with methanol or butanol.

As indicated, the especially preferred aldehyde condensation resin is the condensation product of an aldehyde with a phenol. The most used aldehyde is formaldehyde, although other aldehydes, such as acetaldehyde, can also be employed. Methylene-releasing and aldehyde-releasing agents, such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mistures of phenols are also often employed. Some specific examples of phenols utilized to produce these resins include p-phenylphenol, p-tert-butylphenol, p-tert-amylphenol, cyclopentylphenol and unsaturated hydrocarbon substituted phenols such as the monobutenyl phenols containing a butenyl group in the ortho, meta or para position, and where the double bond occurs in various positions in the hydrocarbon chain.

Of these phenol-aldehyde condensation products, the particularly desirable resins are the methylolphenol ethers of the structure:

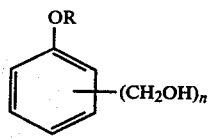

wherein n is an integer of from 1 to 3 and R is an unsaturated aliphatic group or a halogen-substituted aliphatic group. The groups represented by R should contain at least 3 carbon atoms and can be allyl groups (which are preferred) or others such as methallyl, crotyl, butenyl and the like. The halogen-substituted unsaturated groups represented by R can be various mono- and poly-halogenated derivatives of the above unsaturated aliphatic groups, for example, 2-chloro-allyl, 3-chloro-allyl, 3-chloro-2 methallyl, 1-chloro-2-butenyl and corresponding groups contaning halogens such as bromine or fluorine.

The methylol phenol ethers which may be employed herein are described in U.S. Pat. No. 2,579,330 and, as described therein, can be produced from sodium or barium salts of 2,4,6-tris(hydroxymethyl)phenols which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho, para and meta positions). The trimethylolated derivative is generally the predominant component of the composition. Such commercially available methylol ether compositions are especially preferred for use in the invention.

While, as indicated, the especially preferred aldehyde condensation resin is a methylol phenol ether of the type described above, it is often advantageous in obtaining desired physical and chemical properties to employ a mixture of the methylol phenol ether and an aminoplast resin. Thus, for example, the utilization in the coating composition of a mixture of aldehyde condensation resins comprising a methylolphenol ether of the type described above and hexa(methoxymethyl)melamine produces excellent results.

Aldehyde condensation resins may be included in the coating composition in amounts ranging from 5 percent to about 40 percent, preferably 5 to 20 percent by weight based on the total solids weight of the interpolymer and the aldehyde condensation resin.

The water-based coating compositions of the invention can be applied by methods conventionally employed in the coatings industry, such as brushing, dipping, roll coating, flow coating, spraying and the like, but are particularly adapted to be applied by the methods (i.e., roller coating and flow coating) used to coat three piece beverage containers.

After application, the compositions are ordinarily dried and cured by baking at elevated temperatures to produce a hard, thermoset film.

The precise baking schedule will depend upon the particular composition utilized, the nature of the substrate, thickness of the coating and the like. However, baking schedules conventionally employed in the beverage container industry are entirely satisfactory.

The following examples set forth specific embodiments of the instant invention. However, the invention is not to be construed as being limited to these embodiments for there are, of course, numerous possible variations and modifications. All parts and percentages in the Examples, as well as throughout the specification, are by weight unless otherwise indicated.

EXAMPLE A

This example illustrates the preparation of the aqueous dispersion of amine-solubilized interpolymer component of the composition of the invention.

Into a reactor equipped with reflux condenser, heating means, stirrer, thermometer and nitrogen feed line were charged 159.0 grams of ethyl glycol monoethyl ether (ethyl Cellosolve), 325.0 grams of isopropanol, and 290 grams of a monomer mixture consisting of 59.0 percent acrylic acid, 28.2 percent of a 61.5 percent solids solution of N-(butoxymethyl)acrylamide in a 1:3 solvent mixture of toluene and butanol, 32.1 percent of styrene, 32.5 percent of ethyl acrylate and 1.3 percent alpha, alpha'-azobis(isobutyronitrile) catalyst (based on monomer solids, the monomer charge contains 6.7 percent acrylic acid, 19.9 percent N-(butoxymethyl)acrylamide, 36.7 percent styrene and 36.7 percent ethyl acrylate). The charged mixture was then heated under nitrogen to reflux temperature (about 90° C.-93° C.) in a period of about 45 minutes. After reflux had begun, an additional 1081 grams of the above monomer mixture were added to the reactor over a period of about 3 hours. Then 12.0 grams of t-butyl perbenzoate were added in 3 equal increments (i.e., 4 grams each) over a period of about 6 hours with each increment being added at two-hour intervals. At the end of the six-hour period, 337 grams of solvent (slightly more than the original amount of isopropanol used) were stripped from the resultant interpolymer solution by distillation at atmospheric pressure at a temperature of about 94° C. over a period of about 75 minutes. At this point, a sample of the reaction mixture was analyzed for total solids content and found to have a solids content measured at 150° C. of 73 percent by weight. Then 49.8 grams (50 percent theoretical neutralization) of dimethyl ethanolamine were added to the reaction mixture (temperature of the mixture about 97° C.). After addition of the diemthyl ethanolamine was completed, 1939 grams of deionized water preheated to 75° C. was added to the reaction mixture with stirring and the stirring was continued for about one hour after the addition of deionized water was completed.

The aqueous dispersion of interpolymer resulting from the above procedure has the following properties:

| | |
|---|---|
| Polymer solids content | 33.4 percent |
| Aqueous medium content | 65.6 percent |
| Aqueous medium composition: | |

-continued

| | |
|---|---|
| Deionized water | 83.8 percent |
| Organic solvent | 16.2 percent |
| Brookfield Viscosity (77° F., #4 spindle, 20 R.P.M.) | 140 centipoises |

EXAMPLE I

This example illustrates an aqueous coating composition of the invention which is suitable for use as a base coat or size coat. In this example, the aqueous interpolymer dispersion of Example A was blended with an aldehyde condensation resin, in this case a methylol phenol ether and ethylene glycol monoethyl ether (ethyl Cellosolve), to form the coating composition. The composition had the following formulation:

| Ingredients | Parts by Weight |
|---|---|
| Aqueous interpolymer dispersion of Example A | 200.0 |
| Methylon 75108 (methylol phenolether)* | 17.4 |
| Ethylene glycol monoethyl ether | 17.4 |

*A commercially available methylol phenol ether which is essentially a mixture of the allyl ethers of mono-, di- and trimethylol phenols with the trimethylol derivatives predominating, having a solids content of 100 percent and a viscosity (25° C.) of 2000-4000 centipoises.

The coating composition resulting from blending the above ingredients was applied as a base coat to a flat tin-free steel sheet, cut into a body blank, cured 8 minutes at 400° F. and then formed into a can cylinder utilizing an adhesive bonded seam (i.e., three piece construction). The peel strength of the composition was compared to the peel strength of a standard solvent-based base coat control utilized in such containers. The peel strength test (i.e., a standard Instron peel adhesion test) indicated that the test composition (i.e., composition of Example I) had equal or better adhesion than the control compositions. In addition, the test compositions met all other requirements for base coats in such containers.

EXAMPLE II

This example illustrates an aqueous composition comprising a blend of an aqueous interpolymer dispersion and a mixture of aldehyde condensation resins. The composition had the following formulation:

| Ingredients | Parts by Weight |
|---|---|
| Aqueous interpolymer dispersion of Example A | 245.0 |
| Methylon 75108 (methylol phenol ether) | 8.3 |
| Hexa(methoxymethyl)melamine | 8.3 |

The composition resulting from blending the above ingredients was applied as a basecoat to a sheet of tin-free steel, cured, formed into a can cylinder and tested for adhesion utilizing essentially the same procedure employed in Example I.

Peel strength results indicated that the coating had excellent adhesion. This coating also met all other requirements for base coats or size coats in such containers.

According to the provisions of the Patent Statutes, there are described above the invention and what are now considered to be its best embodiments. However, within the scope of the appended claims, it is to be understood that the invention can be practiced otherwise than as specifically described.

I claim:

1. A three piece metal beverage container having an adhesively bonded side seam and having as a base coat or size coat thereon a cured layer of an aqueous coating composition, said composition comprising a blend of an interpolymer and an aldehyde condensation resin wherein:
   A. said interpolymer is an aqueous dispersion of an amine-neutralized or partially-neutralized interpolymer formed in the presence of a vinyl polymerization catalyst and in the absence of mercaptan, external surfactant and dispersion stabilizer, said interpolymer consisting essentially of:
      (1) from about 5 percent to about 50 percent of a substituted carboxylic acid amide formed in units of the structure:

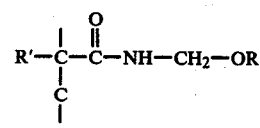

where R' is methyl or hydrogen and R is hydrogen or lower alkyl with at least 50 percent of the groups represented by R being lower alkyl;
      (2) from about 3 percent to about 30 percent of units formed by vinyl polymerization of ethylenically unsaturated carboxylic acid selected from the group consisting of acrylic acid, methacrylic acid, itaconic acid, crotonic acid and maleic acid and half esters of maleic and fumaric acids;
      (3) from about 5 percent to about 75 percent of units derived by vinyl polymerization of hardening monomer selected from the group consisting of styrene, vinyl toluene and alkyl methacrylates having 1 to 4 carbon atoms; and
      (4) from about 5 percent to about 75 percent of units formed by vinyl polymerization of flexibilizing monomer selected from the group consisting of alkyl acrylates having up to 13 carbon atoms in each alkyl group and alkyl methacrylates having from 5 to 16 carbon atoms in each alkyl group; and
   B. said aldehyde condensation resin represents from about 5 percent to about 40 percent by weight of total resin solids and is selected from the group consisting of condensation products of an aldehyde with an amino- or amido-group carrying substance, condensation products of an aldehyde with a phenolic compound and mixtures thereof.

2. The three piece metal beverage container of claim 1 further containing a beverage.

3. The three piece metal beverage container of claim 2 wherein said beverage is beer, a carbonated soft drink, a non-carbonated soft drink or a fruit juice.

4. The three piece metal beverage container of claim 1 wherein the aldehyde condensation resin is the condensation product of an aldehyde with a phenolic compound.

5. The three piece metal beverage container of claim 1 wherein:
   A. the interpolymer consists essentially of:

(1) from about 15 percent to about 30 percent of the substituted carboxylic acid amide units;
(2) from about 5 percent to about 15 percent of the units formed by vinyl polymerization of the ethylenically unsaturated carboxylic acid;
(3) from about 40 percent to about 60 percent of the units formed by vinyl polymerization of the hardening monomer; and
(4) from about 20 percent to about 50 percent of the units formed by vinyl polymerization of the flexibilizing monomer; and B. the aldehyde condensation resin represents from about 5 percent to about 20 percent by weight of total resin solids.

6. The three piece metal beverage container of claim 5 wherein the substituted carboxylic acid amide is N-(butoxymethyl)acrylamide.

7. The three piece metal beverage container of claim 6 wherein the ethylenically unsaturated acid is acrylic acid.

8. The three piece metal beverage container of claim 7 wherein the hardening monomer is styrene.

9. The three piece metal beverage container of claim 8 wherein the flexibilizing monomer is ethyl acrylate.

* * * * *